(12) United States Patent
Wittenauer et al.

(10) Patent No.: US 6,749,942 B1
(45) Date of Patent: Jun. 15, 2004

(54) DURABLE REFRACTORY CERAMIC COATING

(75) Inventors: Jerome P. Wittenauer, Palo Alto, CA (US); Sarah D. Reeves, Sunnyvale, CA (US); Kenneth W. Benner, Fremont, CA (US); Robert D. Yasukawa, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/178,027

(22) Filed: Jun. 24, 2002

Related U.S. Application Data

(62) Division of application No. 09/357,282, filed on Jul. 20, 1999, now Pat. No. 6,444,271.

(51) Int. Cl.$^7$ ............................ B32B 9/04; B32B 18/00
(52) U.S. Cl. ........................ 428/446; 428/448; 428/689; 428/697; 428/699; 428/704; 428/341
(58) Field of Search ............................ 428/446, 448, 428/689, 697, 699, 701, 704, 340, 341; 416/241 B

(56) References Cited

U.S. PATENT DOCUMENTS

| | | | |
|---|---|---|---|
| 3,769,511 A | 10/1973 | Delacy | 250/303 |
| 3,801,363 A | 4/1974 | Buck | 427/377 |
| 4,293,619 A | 10/1981 | Landingham et al. | 428/622 |
| 4,338,380 A | 7/1982 | Erickson et al. | 428/594 |
| 4,358,486 A * | 11/1982 | Ecord et al. | 427/379 |
| 4,530,884 A | 7/1985 | Erickson et al. | 428/608 |
| 5,038,693 A | 8/1991 | Kourtides et al. | 112/440 |
| 5,079,082 A | 1/1992 | Leiser et al. | 428/307.7 |
| 5,277,959 A | 1/1994 | Kourtides et al. | 428/116 |
| 5,296,288 A | 3/1994 | Kourtides et al. | 428/262 |
| 5,306,408 A | 4/1994 | Treglio | 204/192.38 |
| 5,376,421 A | 12/1994 | Sekhar et al. | 427/224 |
| 5,413,851 A | 5/1995 | Storer | 428/361 |
| 5,518,778 A | 5/1996 | Solovjeva et al. | 427/376.2 |
| 5,740,515 A * | 4/1998 | Beele | 428/552 |
| 5,814,397 A | 9/1998 | Cagliostro et al. | 428/216 |
| 5,863,846 A | 1/1999 | Rorabaugh et al. | 442/136 |
| 5,871,820 A * | 2/1999 | Hasz et al. | 427/419.2 |
| 6,261,643 B1 * | 7/2001 | Hasz et al. | 427/419.1 |
| 6,444,271 B2 * | 9/2002 | Wittenauer et al. | 427/376.2 |

FOREIGN PATENT DOCUMENTS

| | | | | |
|---|---|---|---|---|
| EP | 820535 B1 * | 9/2001 | | B22F/05/04 |
| SU | 261965 | 1/1970 | | |
| WO | WO 9631636 A1 * | 10/1996 | | C23C/28/00 |

* cited by examiner

Primary Examiner—Stephen Stein
(74) Attorney, Agent, or Firm—Townsend and Townsend and Crew LLP

(57) ABSTRACT

An article used for thermal protection includes a base structure having at least one surface. The base structure is made of a ceramic oxide material. A silicide coating is formed on the at least one surface of the base structure. The coating comprises a refractory metal and silicon, which together form a silicide. The coating is at least partially diffused into the base structure at the at least one surface.

8 Claims, 4 Drawing Sheets

1590°C
6 Minutes

Refractory Silicide
on HTP 8-22

TUFI + RCG
on HTP 8-22

DURABLE REFRACTORY CERAMIC COATING

CROSS-REFERENCE TO RELATED APPLICATIONS

This application is a divisional application of U.S. patent application Ser. No. 09/357,282 filed Jul. 20, 1999 U.S. Pat. No. 6,444,271.

BACKGROUND OF THE INVENTION

The present invention relates generally to refractory materials, and more specifically, to insulating materials having refractory ceramic coatings. A base structure is coated with a refractory silicide coating. The coating is made of a refractory metal, i.e., those having a melting point above about 1,650° C., and silicon. The combination of these materials forms a "silicide" coating.

DESCRIPTION OF THE RELATED ART

High temperature environments such as those found in atmospheric reentry, jet turbine combustion, or rocket propulsion, necessitate the use of thermal protection systems that provide oxidation protection, high emissivity, and resistance to mechanical damage. One example of such a system is the tile used to cover the outer surfaces of the underbody and wings of NASA's Space Shuttle Orbiter. Each tile is a lightweight, fibrous, silica-based rigid fibrous insulation unit with a nominal density of nine (9) pounds per cubic foot (pcf). The tile is made by the assignee of the present invention and designated as "LI-900."

A variation of LI-900, called LI-2200, and likewise manufactured by the assignee herein, is a twenty-two (22) pcf version of the LI-900 that offers improved strength at a sacrifice in weight.

To improve strength, a new class of rigid reusable insulation was developed. These consist of the following composite ceramic materials: FRCI, AETB, and HTP. A further variation of LI-900, made by NASA's Ames Research Center and designated "FRCI-12," consists of a blend of silica and aluminoborosilicate fibers. FRCI-12 has a density of twelve (12) pcf All three of these materials are currently qualified for use on the Shuttle Orbiter Fleet.

"HTP," which stands for "high thermal performance," refers to a new class of lightweight ceramic material introduced by the assignee herein around 1982. Basically, this high-strength insulation is produced by fusing silica and alumina fibers together. The insulation is produced to a number of standard densities at a standard composition of twenty-two (22) percent. The HTP family of insulants has yielded improvements in strength and maximum temperature capability relative to earlier generations of ceramic insulation. Also, at about the time HTP was introduced, NASA (Ames Research Center) introduced the rigid fibrous insulation material known as "AETB."

Coatings have been used in conjunction with refractory metals, such as tantalum, niobium, and molybdenum, to protect the underlying metallic structures from oxidation and erosion experienced in high temperature propulsion environments. Silicide coatings have been used in the past for such purposes.

The TPS tiles noted above have in the past been protected by application of reaction cured glass (RCG) coatings. These coatings were developed in the early 1970's for the LI-900 class of thermal insulants. RCG is composed mostly of silica with a small amount of silicon hexa/tetraboride added as a blackening agent and a fluxing agent. The coating is applied as a 8–12 mils thick layer onto the surface of a ceramic tile. As a surface coating, RCG has relatively poor resistance to impact; as a silica-based system, RCG's maximum temperature capability is limited to its softening point of about 2,700–2,800° F.

In 1989, NASA's Ames Research Center developed an insulation product called toughened uni-piece fibrous insulation (TUFI). The coating was still silica-based, but it contained about twenty (20) percent molybdenum disilicide as a blackening agent. TUFI products represented an advancement in the state of the art because the coating is applied as a surface impregnation, meaning that it became commingled with the fibers of the insulation tile near the surface region. The resultant fused coating is a fiber reinforced glass which is much more durable than the RCG coating. As a silica-based coating, however, the TUFI product has the same upper temperature limit as RCG, i.e., 2,700–2,800° F. TUFI has been successfully applied to FRCI, HTP, and AETB.

Refractory metal coatings have been used in ceramic applications. For example, U.S. Pat. No. 5,413,851 to Storer describes a ceramic carbon fiber coated with a refractory metal or metal-based ceramic material. The refractory metal materials used include molybdenum, tantalum, tungsten, niobium, oxides of aluminum, yttrium, zirconium, hafnium, gadolinium, titanium, erbium and other rare earth metals. The fibrous materials that are coated include alumina, alumina-silica, and alumina-boria- silica. The coatings are used to enhance strength.

U.S. Pat. No. 4,530,884 to Erickson et al. describes a ceramic-metal laminate which is used as insulation in high temperature environments. The composites described therein have an inner ceramic layer and an outer metal layer and an intermediate interface layer of a low modulus metallic low density structure. These composites are principally used as turbine blades of gas turbine engines.

U.S. Pat. No. 5,863,846 to Rorabaugh et al. describes a ceramic insulation used in aerospace applications in which a slurry is molded from ceramic fiber to form a soft felt mat which is impregnated with a sol prior to drying. The mat is exposed to a catalyst that diffuses into the mat and causes the sol to gel.

U.S. Pat. No. 5,814,397 to Cagliostro et al. describes ceramic materials used in space re-entry vehicles in which silica coatings are formed on fibrous insulations. U.S. Pat. No. 5,079,082 to Leiser et al. describes a porous body of fibrous, low density silica-based insulation material that is impregnated with a reactive boron oxide-containing borosilicate glass frit, a silicon tetraboride fluxing agent, and a molybdenum silicide emittance agent.

A continuing need exists for improved lightweight thermal insulation materials that are temperature resistant and physically durable. In particular, improved coatings, such as those described below, are needed for all of the advanced rigid, fibrous insulation materials described above, such as FRCI, HTP, and AETB.

SUMMARY OF THE INVENTION

An object of the present invention is to provide an insulative material that exhibits oxidation protection, high emissivity, and resistance to mechanical damage.

Another object of the present invention is to provide an insulative material that is capable of withstanding high-temperature environment, including those associated with atmospheric reentry, jet turbine combustion, and rocket propulsion.

Still another object of the invention is to provide a silicide coating that exhibits higher temperature capability than silica-based coatings.

These and other objects of the invention are met by providing a thermal protection system comprising a base structure having at least one surface, the base structure being made of a ceramic oxide material, and a coating formed on the at least one surface, the coating comprising a refractory metal and silicon and being at least partially infiltrated into the base structure at the at least one surface.

The foregoing features and advantages of the present invention will be further understood upon consideration of the following detailed description of the invention taken in conjunction with the accompanying drawings.

DETAILED DESCRIPTION OF THE PREFERRED EMBODIMENTS

Figure 1:
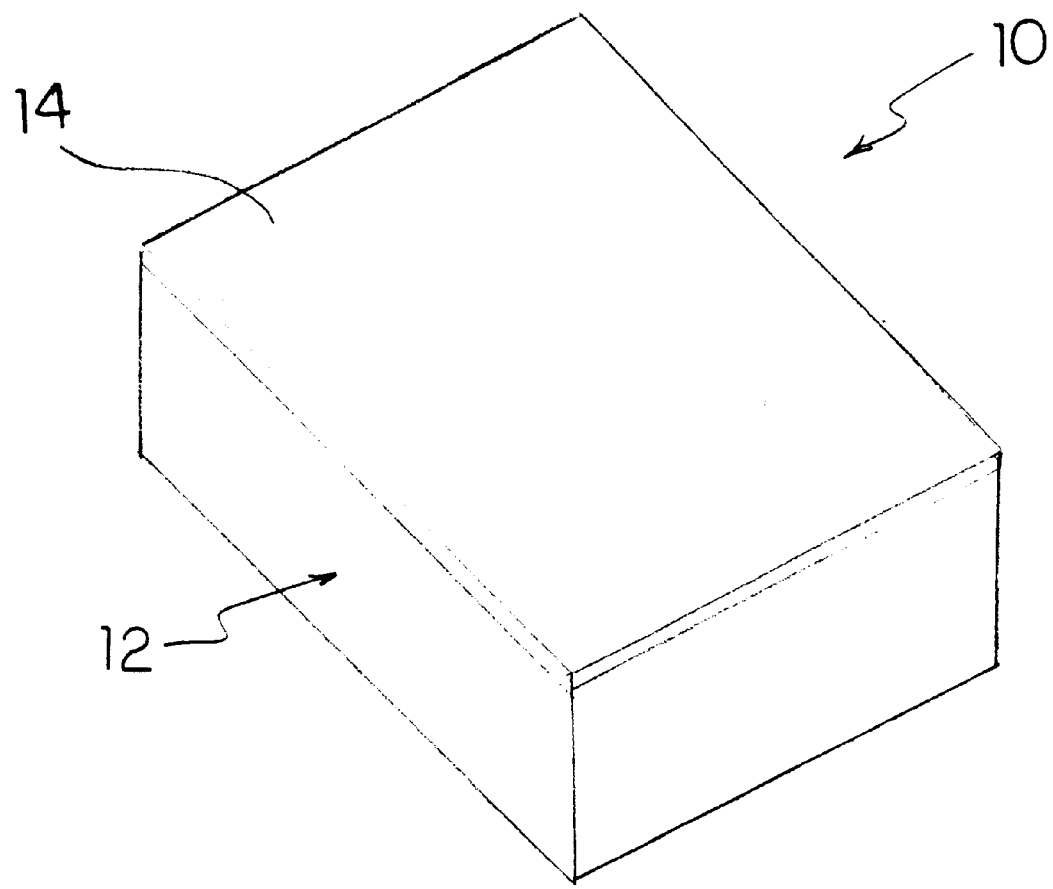
FIG. 1 is a perspective view of a thermal insulation system according to the present invention.
Figure 2:
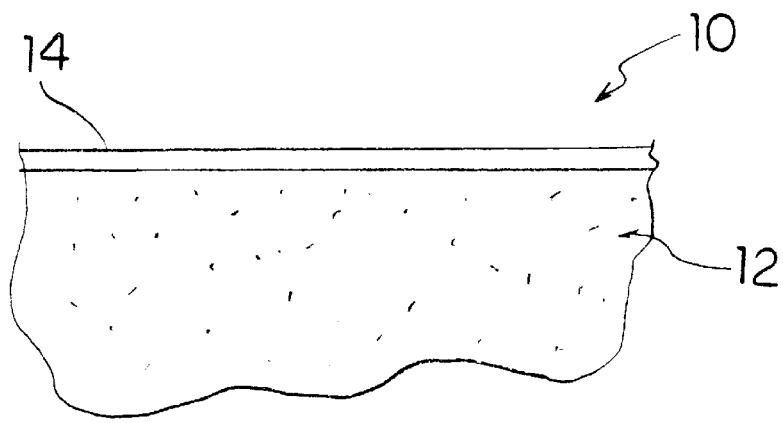
FIG. 2 is an enlarged side elevational view of the thermal insulation system of FIG. 1.

Referring to FIG. 1, a thermal insulation system is generally referred to by the numeral 10. The system can be an insulating structure, such as a tile or any other object shaped and sized to perform a specific function. The polyhedron shape of the system 10 was chosen for illustration purposes. Virtually any shape is contemplated to be within the scope of the present invention. Of course, a typical system may employ numerous, similarly shaped objects, such as in the tiles used on the outer surfaces of NASA's Shuttle Orbiter. For example, the thermal protection system 10 could be a thermal insulation tile having the dimensions of six (6) inches by six (6) inches by two (2) inches. The tiles may be flat or profiled to adopt any desirable shape.

The thermal protection system 10 includes a base structure 12 having at least one outer surface. The base structure 12 is preferably made of a ceramic oxide material.

Preferred ceramic oxide materials include those advanced examples discussed above. While other materials can be used, the base structure is preferably a ceramic oxide, for example: zirconia, alumina, and/or silica/alumina blends.

A coating 14 is formed on one or more of the surfaces of the base structure 12. The coating 14 is made of a refractory metal and silicon and is at least partially diffused into the base structure 12 at the at least one surface. The refractor silicide coating employs the same surface impregnation strategy as the silica-based TUFI materials used in the past, but substitutes a composition that is nearly 100% refractory metal silicide. The coating 14 is formed from any of the refractory metals, meaning those elements with melting points in excess of 1,650° C., in combination with silicon. This combination produces a "silicide" coating. Examples include molybdenum silicide, tantalum silicide and niobium silicide.

A particularly preferred material for the coating 14 is molybdenum silicide. Molybdenum disilicide has a melting point that is approximately 350° F. higher than silica. The result is that the silicide coating has higher temperature capability than the silica-based coatings used in RCG and TUFI materials. Moreover, since the silicide coatings described herein are applied as a surface impregnation, the present materials are as durable as the TUFI materials. RCG and TUFI silica-based coatings have a melting point of about 3,180° F. and a softening point of between about 2,700 and 2,800° F. In contrast, the present silicide-based coatings have a melting point of about 3,540° F., and a softening point between about 2,900 and 3,000° F.

Any of the refractory metals can be used as a constituent of the coating 14, including molybdenum, tantalum, niobium, vanadium, chromium, and tungsten, or any other materials that are comparable chemically and with respect to melting point.

The molybdenum silicide coating 14 is prepared from high purity molybdenum disilicide and molybdenum diboride powders. Boron nitride and other forms of boron may be used as an alternative source of boron. The silicide provides the desired high melting point and high emissivity characteristics. The boride serves as a flux to allow low temperature fusion of the coating and also plays a role in providing oxidation resistance to the coating. As with RCG and TUFI coatings, these powders are formulated into a slurry and applied at a pre-specified coating weight to the surface of the ceramic oxide base structure 12 by either brushing or spraying. The coating is fused in an air furnace at a temperature in the range of about 1,800° F. to about 2,600° F. A more preferred range is between 2,100° F. and 2,400° F.

The slurry which contains the constituent powdered materials includes a liquid carrier, which is a polymeric stock solution known and used in the art. The heating time in the air furnace can be anytime sufficient to allow fusion and attachment of the coating to the base structure. A typical time range is between one (1) and two (2) hours. The temperature is likewise selected to effect fusion of the coating, and should be kept below the sintering temperature of the substrate, or base structure, which for the aforementioned preferred materials is about 2,600° F.

The coating 14 can be varied in thickness. "Thickness" refers to the coating material on the surface and that which has diffused into the base material, forming an infiltration zone beneath the surface. In a particularly preferred embodiment, for tiles used on the X-33 spacecraft currently under development, the coating 14 has a weight of about 1.0 gram per square inch, which provides a coating of about 0.030 inches. In this particular structure, the thickness of 0.030 inches represents only the surface coating and not the infiltration zone. In general, the infiltration zone varies depending on the substrate material. A generally preferred range of weights is 0.25 to 2.0 grams per square inch for the surface coating (excluding the infiltration zone). The coating durability tends to increase with higher coating weights. It will be recognized by those skilled in the art that a broader range of weights and thickness are possible, depending on the specifications of the end product.

Figure 3:
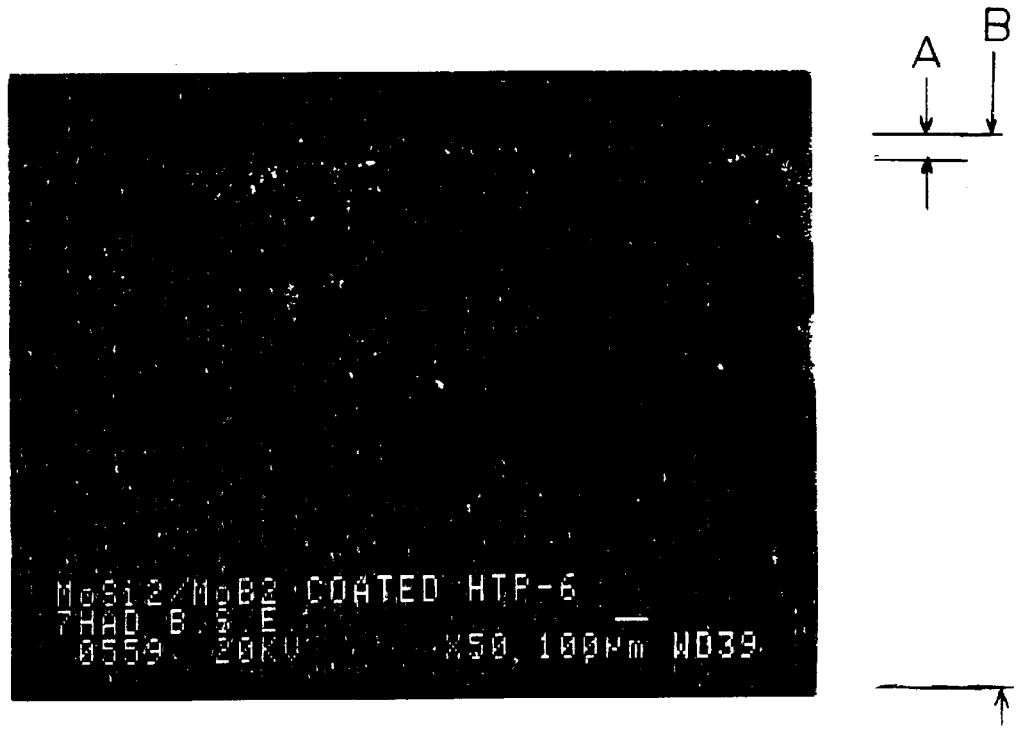
FIG. 3 is an photo-micrograph, magnified at 50×, of the thermal insulation system of FIG. 1.

The coating 14 is applied to achieve a true surface impregnation resulting in a silicide coating that is reinforced by the fiber network of the underlying silica-based rigid fibrous insulation material which forms the base structure 12 this can be seen in FIG. 3, which is a photomicrograph of a base structure coated with molybdenum disilicide. The molybdenum disilcide is shown as the lighter colored regions, and the ceramic oxide material which forms the base structure is shown as the darker regions. It is evident that the molybdenum disilicide has diffused into the base structure. The infiltration zone, referred to above, corresponds to the distance between the outer surface of the surface coating and the lower-most area of penetration of the coating material into the base material. Referring to FIG. 3, the thickness of the surface is approximately shown by the letter "A" and the infiltration zone, which includes the surface depth, is shown by the letter "B." The result is a highly durable coating.

Figure 4:
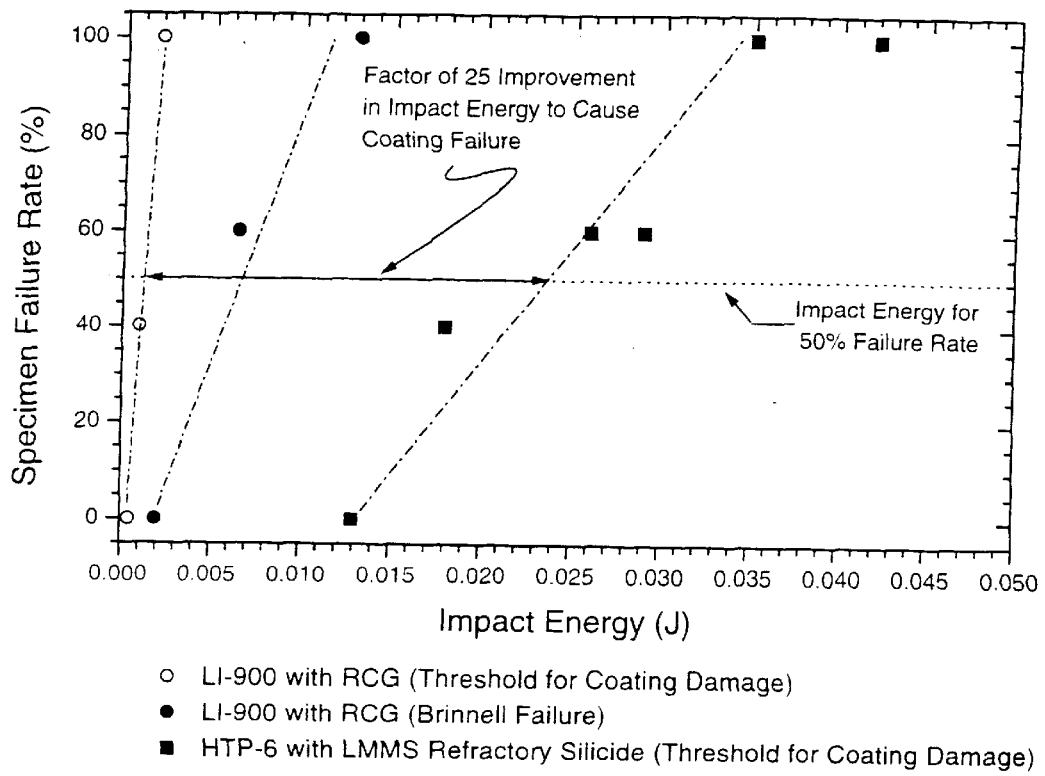
FIG. 4 is a graph showing impact energy vs. failure rate of the thermal insulation system of FIG. 1, compared to that of a prior art insulation material.

Durability of products made according to the present invention is demonstrated with reference to FIG. 4, which shows impact test results for LI-900 prior art coated ceramic thermal protection tiles, and HTP-6 which incorporates the refractory silicide coatings of the present invention. The test was conducted as follows: A steel ball having a volume of one (1) cubic centimeter was dropped from a fixed height and impacted the surface with an energy measured in Joules (along the x-axis of FIG. 4). For each impact energy, five drop tests were conducted and the fraction of coating failures was noted. The drop height for 0.002J was 2.5 cm; for 0.007 the drop height was 8.0 cm; for 0.026J the drop height was 32.0 cm; and for 0.042 the drop height was 51.0 cm. Coating failure was defined as follows: "damage threshold" for RCG coating is the appearance of a surface crack; "Brinnell failure" for RCG coating is large area cracking of the RCGT accompanied by crushing of underlying LI-900 material; and "damage threshold" for LMMS refractory silicide coating is surface spall. For the latter, the coating does not fail by cracking as does RCG. As is evident from the plotted points, the present invention achieved a factor of 25 improvement in impact energy.

EXAMPLE

To make tiles used for the X-33 spacecraft, a slurry was created by using 43% by weight molybdenum silicide powder (100 mesh), 7% by weight boron nitride powder (325 mesh), 2.5% by weight liquid stock solution A, which is a polymer-based binder, and 47.5% denatured ethanol. These materials are combined and jar milled to produce a spray slurry which has a density of 11.5+/−0.5 pounds per gallon, and a particle size distribution as follows:

| Mass % finer | Microns |
| --- | --- |
| 90 | 5.25 to 13.76 |
| 50 | 3.30 to 5.57 |
| 10 | .51 to 1.50 |

The slurry is then sprayed to desired thickness and then dried at temperatures and times specified above.

Products made according to the present invention were tested against the prior art and were shown to have marked increases in thermal performance and durability. In a comparative burner rig test, refractory silicide coatings of the present invention were tested against a NASA Ames TUFI+ RCG. Both the present coatings and the NASA coatings were made on a base structure made of HTP 8–22. The TUFI+RCG coating had a weight of 1.07 $g/in^2$ and the present coating, a molybdenum silicide ($MoSi_2+MoB_2$), had a total coating weight of 0.57 $g/in^2$.

Figure 5:
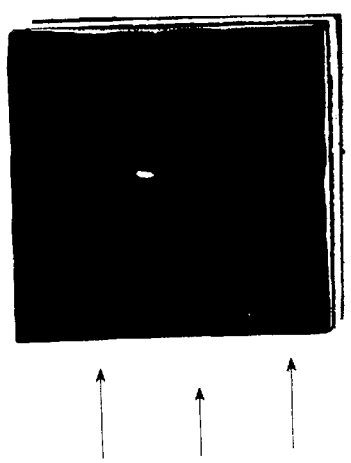
FIG. 5 is a photograph showing two samples of material after exposure to high temperatures, in which a sample of the present invention exhibited high temperature resistivity.
Figure 5:
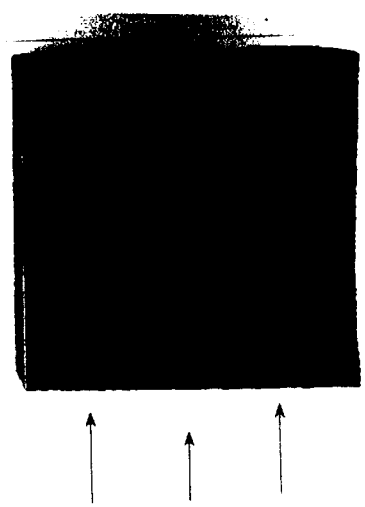

Test samples were exposed to an array of torches fueled by acetylene, hydrogen, and oxygen. The temperature was measured by optical pyrometer and thermocouple. FIG. 5 shows two test samples, one being the present invention and the other the prior art, after 6 minutes of heat at 1590° C. The sample on the right shows heavy pitting, while the present invention, the sample on the left, survived the high temperature heating. Other tests have shown that the present coatings can withstand temperatures in a flame test of up to about 2,950° F.

While advantageous embodiments have been chosen to illustrate the invention, it will be understood by those skilled in the art that various changes and modifications can be made therein without departing from the scope of the invention as defined in the appended claims.

What is claimed is:

1. A thermal protection system, comprising:

a base structure having at least one surface, the base structure being made of a ceramic oxide material; and a silicide coating formed on the at least one surface, the coating including molybdenum silicide and molybdenum boride and being at least partially diffused into the base structure at the at least one surface.

2. The thermal protection system according to claim 1, wherein the silicide coating further includes at least one of tantalum silicide and niobium silicide.

3. The thermal protection system according to claim 1, wherein the silicide coating further includes at least one of tungsten, tantalum, niobium, vanadium and chromium.

4. The thermal protection system according to claim 1, wherein the silicide coating further includes boron in an amount sufficient to lower the melting point of the coating and thereby facilitate fusion of the coating.

5. The thermal protection system according to claim 1, wherein the base structure is a silica-based rigid fibrous insulation material of predetermined size and shape.

6. The thermal protection system according to claim 1, wherein the silicide coating has a weight of between about 0.25 and 2.0 grams per square inch.

7. The thermal protection system according to claim 1, wherein the silicide coating is temperature resistant up to about 2,950° F.

8. The thermal protection system according to claim 1, wherein the silicide coating has an impact energy for 50% failure of about 0.02 Joules.

* * * * *